United States Patent [19]

Ku et al.

[11] Patent Number: 5,812,881

[45] Date of Patent: Sep. 22, 1998

[54] HANDSHAKE MINIMIZING SERIAL TO PARALLEL BUS INTERFACE IN A DATA PROCESSING SYSTEM

[75] Inventors: Yi-Ming Ku, Austin; Thang Q. Nguyen, Cedar Park, both of Tex.

[73] Assignee: International Business Machines Corporation, Armonk, N.Y.

[21] Appl. No.: 827,744

[22] Filed: Apr. 10, 1997

[51] Int. Cl.$^6$ .................................................. G06F 15/17
[52] U.S. Cl. .................... 395/891; 395/822; 395/800.38; 395/872
[58] Field of Search .................................... 395/891, 822, 395/800.38, 872

[56] References Cited

U.S. PATENT DOCUMENTS

| | | | |
|---|---|---|---|
| H1472 | 8/1995 | Tran .......................................... | 395/500 |
| 4,728,930 | 3/1988 | Grote et al. .............................. | 341/101 |
| 5,005,151 | 4/1991 | Kurkowski ............................... | 395/856 |
| 5,016,011 | 5/1991 | Hartley et al. ............................ | 341/95 |
| 5,025,257 | 6/1991 | Hartley et al. ........................... | 341/101 |
| 5,457,786 | 10/1995 | Roush ...................................... | 395/280 |
| 5,546,393 | 8/1996 | Minc ........................................ | 370/395 |

*Primary Examiner*—Kenneth S. Kim
*Attorney, Agent, or Firm*—Winstead Sechrest & Minick P.C.

[57] ABSTRACT

A serial/parallel interface for interfacing the serial port of a microcontroller with parallel bus devices, and a protocol for communicating with the same. The interface operates to maximize through-put with minimum handshaking. When the bus device is a nonvolatile memory containing the operating software of the microcontroller system, the interface provides for dynamic updating of the operating program. It also relieves the constraints imposed on the number of bus devices accessible to the microcontroller system because of the limited number of I/O pins available on the microcontroller.

3 Claims, 5 Drawing Sheets

HANDSHAKE MINIMIZING SERIAL TO PARALLEL BUS INTERFACE IN A DATA PROCESSING SYSTEM

TECHNICAL FIELD

The present invention relates in general to embedded controller systems, and in particular, to a serial bus to parallel bus interface in an embedded controller system.

BACKGROUND INFORMATION

In systems employing an embedded microcontroller, the limitations of the microcontroller with respect to the available I/O pins and on-device memory can impose unacceptable design constraints on the system. The number of I/O pins that are available constrain the size of the address space accessible by the microcontroller. This then limits the size and number of bus devices that reside in the address space. This need not only limit the size of memory available for software and data, but also may limit peripheral devices that are accessible by the microcontroller. Furthermore, on-device nonvolatile memory is typically very limited in its size, making storage of the operating software in an external memory space essential. Moreover, the microcontroller often is a one time programmable ("OTP") device, so that once the software is "burned into" the on-chip nonvolatile memory, it cannot be modified. The system software then cannot be updated without replacing the microcontroller chip itself.

Therefore, it may be desirable to store the system software in a nonvolatile programmable memory that resides in the external memory space. Updating of the system software could then be performed by downloading the new software into the nonvolatile memory. However, having the system program reside in the external memory space rather than on-chip only exacerbates the problem of a limited number of I/O pins.

Therefore, there is a need in the art for a method and circuitry to interface a microcontroller with nonvolatile memory containing its operating software such that the software can be easily updated by downloading the new software into the nonvolatile memory without exceeding the pin count of the microcontroller.

SUMMARY OF THE INVENTION

The previously mentioned needs are fulfilled with the present invention. The present invention satisfies the foregoing need by making use of the serial port available on a microcontroller in association with a serial-to-parallel bidirectional bus interface (hereinafter referred to as the serial/parallel interface). The serial/parallel interface accepts serial cycles from the microcontroller, and then converts them into cycles that are recognizable by the nonvolatile memory, which is a parallel bus device. Data representing the code to be downloaded is clocked out of the serial port of the microcontroller into the serial/parallel interface. The serial/parallel interface then presents this data on its parallel data bus, enabling the data to be read into the nonvolatile memory residing on the address space of the serial/parallel interface. Use of the serial port on the microcontroller in association with the serial/parallel interface is advantageous in that it makes the limited number of input/output ("I/O") pins available on the microcontroller available for parallel bus devices, including random access memory ("RAM") devices that require real time access by the microcontroller.

Another advantage of the present invention is that it enables the system software to be updated dynamically. In operation, the microcontroller runs under the control of its system software which is located in a RAM residing in the address space of one of the microcontroller's I/O ports. The operating code is uploaded into RAM at startup from the nonvolatile memory through the serial/parallel interface and the microcontroller serial port. Updated software can then be downloaded to the nonvolatile memory through the microcontroller serial port and serial/parallel interface while the microcontroller runs under the control of the software code resident in RAM. In this way another objective of the invention is achieved.

In order to maximize data through-put between the microcontroller serial port and the nonvolatile memory, it is desirable to minimize handshaking between the microcontroller and the serial/parallel interface. This is achieved in the present invention by incorporating logic within the serial/parallel interface itself to control the flow of data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
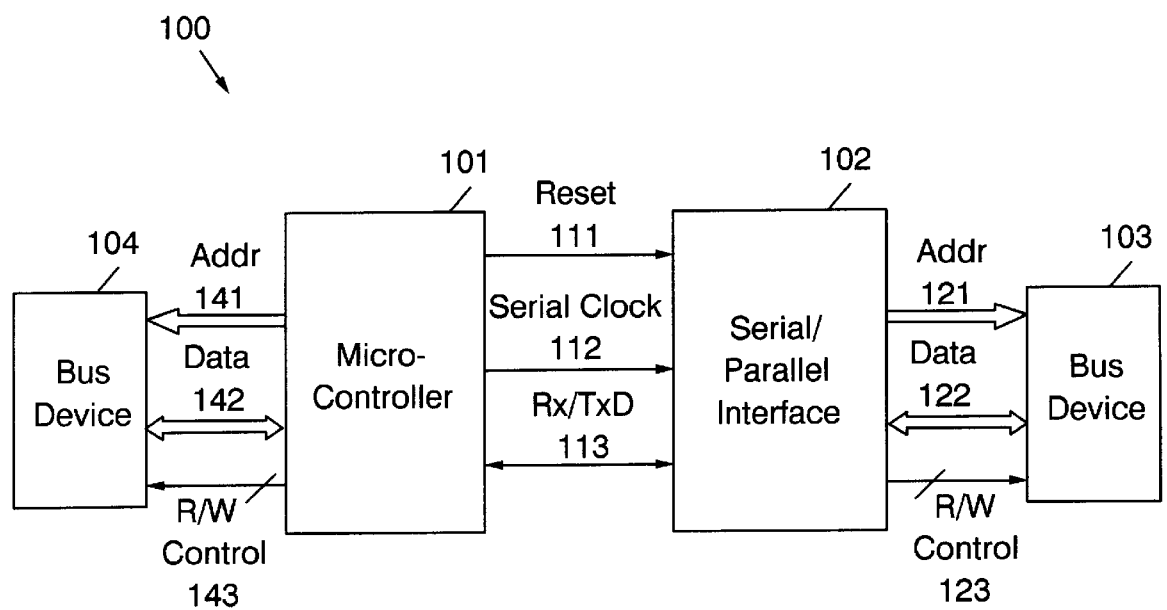
FIG. 1 illustrates a block diagram of an embodiment of a microcontroller system using the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. During the following description of the implementation of the present invention, the terms "assert" and "negate" and various grammatical forms thereof, are used to avoid confusion when dealing with a mixture of "active high" and "active low" logic signals.

"Assert" is used to refer to the rendering of a logic signal or register bit into its active, or logically true, state. "Negate" is used to refer to the rendering of a logic signal or register bit into its inactive, or logically false state.

Refer now to the drawings wherein depicted elements are not necessarily shown to scale and wherein like or similar elements are designated by the same reference numeral through the several views.

An invention that alleviates the pinout problem in a microcontroller system, and incorporates dynamic updating of the operating software will now be described in detail. Referring to FIG. 1, there is shown a microcontroller system 100 in accordance with one embodiment of the present invention. Microcontroller 101 communicates with the serial/parallel interface 102 by means of three signal lines, Reset 111, Serial clock 112, and Rx/TxD 113. An operation which might either download data to a parallel bus device 103 or upload data from the parallel bus device 103 is initiated by a signal on reset line 111. Serial data is either clocked out of microcontroller 101 serial port or into microcontroller 101 serial port depending on the operation. Serial data is communicated between the bidirectional serial port of microcontroller 101 and the serial/parallel interface 102 on the bidirectional serial data line, Rx/TxD line 113. The serial clock of microcontroller 101 is sent to serial/parallel interface 102 via serial clock line 112. In a download, or write, operation, serial data is received by the serial/parallel interface 102, and provided to parallel bidirectional data bus 122. Data bus 122 is an m-bit parallel data line, where m is a predetermined integer number of bits. Conversely, in an upload, or read, operation, bus device 103 sets up the data to be sent to microcontroller 101 on the bidirectional data bus 122 where it is received by the serial/parallel interface 102. Data is then clocked out by the serial/parallel interface 102 on line Rx/TxD 113 where it is received at the serial port of microcontroller 101. The address at which data is either to be written or read is provided to serial/parallel interface 102 on its address line 121. Address line 121 is an n-bit address bus, where n is a predetermined integer number of bits. Serial/parallel interface 102 informs bus device 103 when a read or write operation is being executed using read/write ("R/W") control bus 123. Serial/parallel interface 102 may access more than one bus device. In such an embodiment, R/W control bus 123 would implement a chip select signal on one of its lines. Chip select operation and circuitry are understood by artisans of ordinary skill in the art. Bus device 103 may be implemented as a memory, including nonvolatile memory, or a peripheral bus device in one embodiment of the invention. Additionally, it should be noted that bus device 103 may be any device in a data processing system that communicates via a parallel bus.

Figure 2:
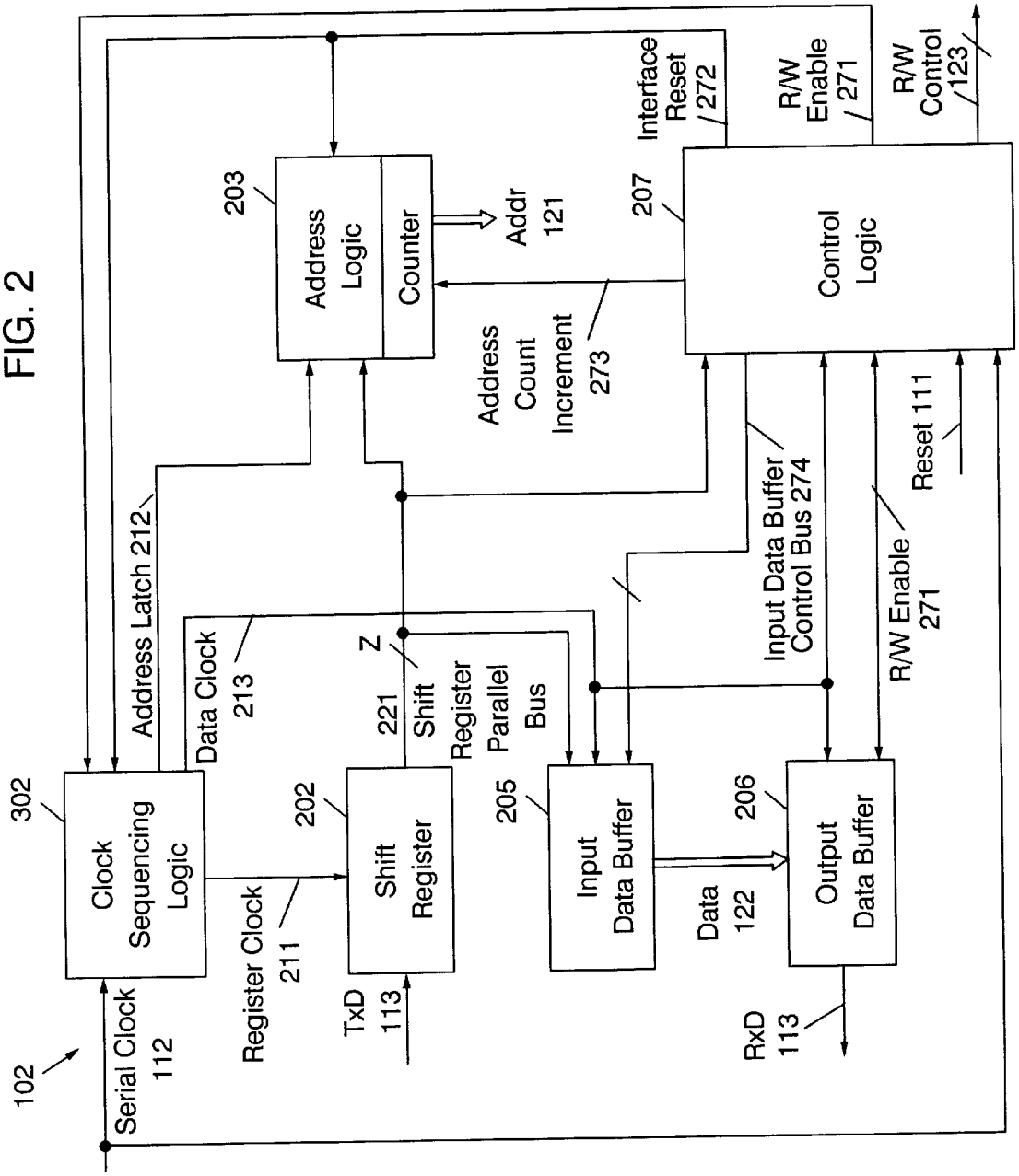
FIG. 2 illustrates a block diagram of an embodiment of the serial/parallel interface of the present invention.

Microcontroller system 100 may also include other bus devices such as bus device 104 which reside in the address space of microcontroller 101. Data is transmitted to, or received from, bus device 104 on parallel data bus 142, and the address at which the read or write operation takes place is provided by an address bus 141 of microcontroller 101. Microcontroller 101 informs bus device 104 as to a read or write operation by asserting read/write bus 143. A more detailed understanding of the invention may be had by now referring to FIG. 2 depicting a block diagram of an embodiment of serial/parallel interface 102.

An operation is initialized by microcontroller 101 (not shown in FIG. 2) asserting reset line 111. In response to the signal on reset line 111, control logic 207 resets address logic 203 and clock sequencing logic 201 by asserting the interface reset line 272. Microcontroller 101 then clocks out the initial n-bit address to be asserted on address line 121. The initial n-bit address corresponds to the location of the first block of data to be uploaded or downloaded. This address is clocked into shift register 202 by register clock 211 generated by clock sequencing logic 201. Clock sequencing logic 201 receives the serial clock from microcontroller 101 on serial clock 112. Register clock 211 is synchronized with serial clock 112. Microcontroller 101 may send the initial address byte-by-byte. In such an embodiment, microcontroller 101 sends bytes of the address sequentially until all n-bits of the address have been sent. Clock sequencing logic 201 accumulates serial clock cycles. After all n-bits are received, clock sequencing logic 201 latches the address which appears on the parallel bus 221 of shift register 202 into address logic 203 by asserting address latch 212. Parallel bus 221 is Z bits in length, where Z is predetermined integer value.

After the initial address has been transmitted, microcontroller 101 sends a command byte. Control logic 207 receives the serial clock from microcontroller 101 on serial clock line 112. It accumulates clock cycles until the eight bits of the command byte have been clocked in. It then latches the command byte which it receives on the parallel bus 221 of shift register 202. The state of the first bit of the command byte determines whether the operation to be performed is a read or a write. The control logic 207 then uses this to establish the state of R/W enable 271. Input data buffer 205 and output data buffer 206 are enabled or disabled according to the state of R/W enable line 271.

Read operation commences when microcontroller 101 issues a read command to its serial port. The serial clock signal 112 is passed to the output data buffer 206 by clock sequencing logic 201 via data clock line 213. Output data buffer 206 has been enabled by the signal on the R/W enable line 271. A read state is also asserted on R/W control bus 123 informing the bus device 103 (not shown in FIG. 2) that a read is being performed. The m-bits of data are serially read out, then control logic 207 asserts the address count increment signal 273, causing address logic 203 to address the next m-bit data block. After m-bits of data have been provided to microcontroller 101, clock sequencing logic 201 stops issuing clock signals to output data buffer 206. M-bit blocks of data are sequentially received by microcontroller 101 by repeating this operation. The read operation is terminated when microcontroller 101 asserts reset 111, to indicate that serial/parallel interface 102 should be reset in anticipation of the next operation.

Write operation commences when microcontroller 101 writes data to its serial port in response to an instruction in the software code. This is not shown herein, but it is well understood by one of ordinary skill in the art. Input data buffer 205 receives the m-bit data block on the parallel bus 221 of shift register 202. The data are latched into input data buffer 205 in response to data clock 213. Control logic 207 may control the latching of data into input data buffer 205 via input data buffer control line 274. In an alternative embodiment, alternative means may be used to latch data into input data buffer 205. Such means are well know in the art. Control logic 207 also receives data clock 213. In response thereto, control logic 207 asserts a write state on R/W control bus 123, causing bus device 103 to access the data on the data bus 122. Control logic 207 also asserts address count increment 273, causing address logic 203 to increment an address counter. The address of the location into which the next n-bit block of data is to be downloaded is then provided on address bus 121 by address logic 203. The write operation continues to execute these steps until all of the data to be downloaded has been transmitted. Microcontroller 101 then signals the end of the write operation by asserting reset line 111, to inform the serial/parallel interface 102 to reset in anticipation of a next operation.

Data may be downloaded byte-by-byte in an interleaved fashion. In such an embodiment, if a write operation has been contemplated, the last four bits of the command byte contain the lower four bits ("low nibble") of the first output byte. If a read operation is contemplated, the value of bits one through seven of the command byte are ignored. Control logic 207 decodes the first bit of the command byte, and on detecting the write operation, instructs input data buffer 205 to latch these four bits. Control logic 207 decodes the first bit of the command byte, and on detecting the write operation, instructs input data buffer 205 to latch these four bits. Then, the low nibble of the first output byte sent by microcontroller 101 contains the upper four bits ("high nibble") of the first data byte, and the high nibble of the first output byte contains the low nibble of the next data byte to be downloaded. Control logic 207 steers the latching of the output byte into internal registers (not shown) in input data buffer 205, via input buffer control bus 274. This steering effects the assembly of the two nibbles, transmitted in interleaved fashion, into a full data byte. It would be well understood by an artisan of ordinary skill that communication of data bytes using this method is independent of whether the mode of data representation is least significant bit ("LSB") first, or most significant bit ("MSB") first. Control logic 207 continues to accumulate input data byte-by-byte until all m-bits of data have been assembled. It then loads the data into input data buffer 205 and operation continues as described above. Further understanding of the operation of the invention may be had by now referring to FIG. 3 in which a block diagram of another embodiment of the invention is shown.

Figure 3:
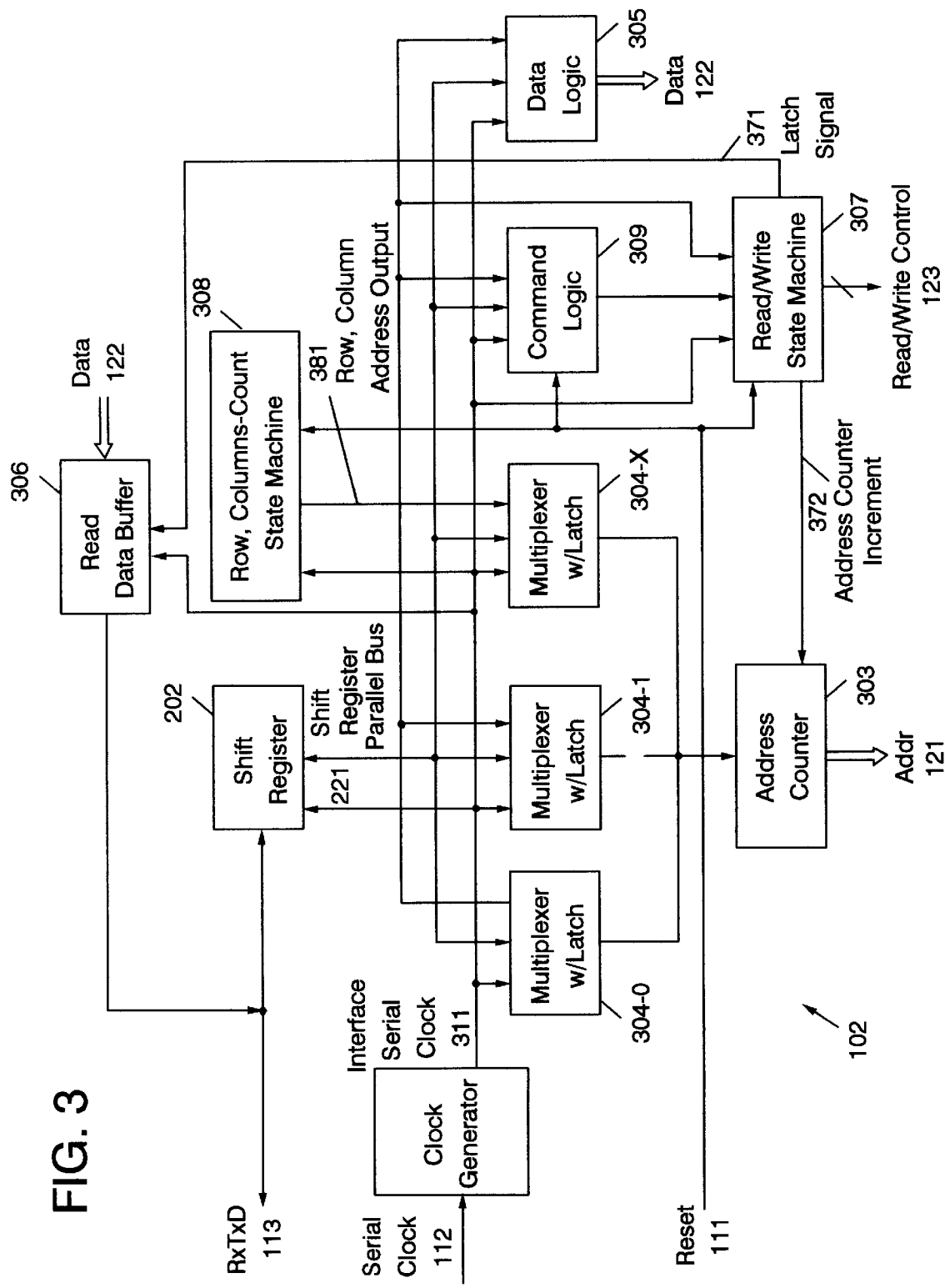
FIG. 3 illustrates a block diagram detailing another embodiment of the serial/parallel interface of the present invention.

In FIG. 3, operation begins with microcontroller 101(not shown in FIG. 3) asserting reset 111 to causes read/write state machine 307, row, column-count state machine 308, and command logic 309 to reset. Microcontroller 101 then commences to download an initial address on address bus 121 at which a download or upload operation is to begin. Microcontroller 101 transmits the n-bit address by clocking the address out of its serial port on Rx/TxD line 113. The address is clocked into shift register 202 on serial/parallel interface 102; the address transfer may be byte-by-byte. Microcontroller 101 also outputs its serial clock on serial clock line 112. Clock generator 301 receives serial clock 112 and outputs interface serial clock pulses on interface clock line 311. The interface clock is synchronized to serial clock 112. Clock generator 301 may output an interface clock pulse on each of the rising and falling edges of serial clock 112. Clocking of shift register 202 is controlled by the signal on interface clock line 311.

The initial address is stored by a plurality X of mutiplexers-with-latch referred to as 304-0 through 304-X, where X is an integer value equal to a predetermined number of multiplexers-with-latch. The initial address may be stored byte-by-byte. Mutiplexer-with-latch 304-1 through mutiplexer-with-latch 304-X are coupled to the parallel bus 321 of shift register 302. A mutiplexer-with-latch that will store the current block of the m-bit address being transmitted is selected by decoding the row and column count signal provided on output bus 381 of row, column-count state machine 308. A block of the n-bit address may be a byte in length. After the current block has been clocked out of microcontroller 101 and into shift register 202, the address is latched into the selected one of mutiplexer-with-latch 304-0 through mutiplexer-with-latch 304-X by an interface clock pulse on line 311. After all n-bits of the address have been sent, the address is loaded into address counter 303.

Figure 4:
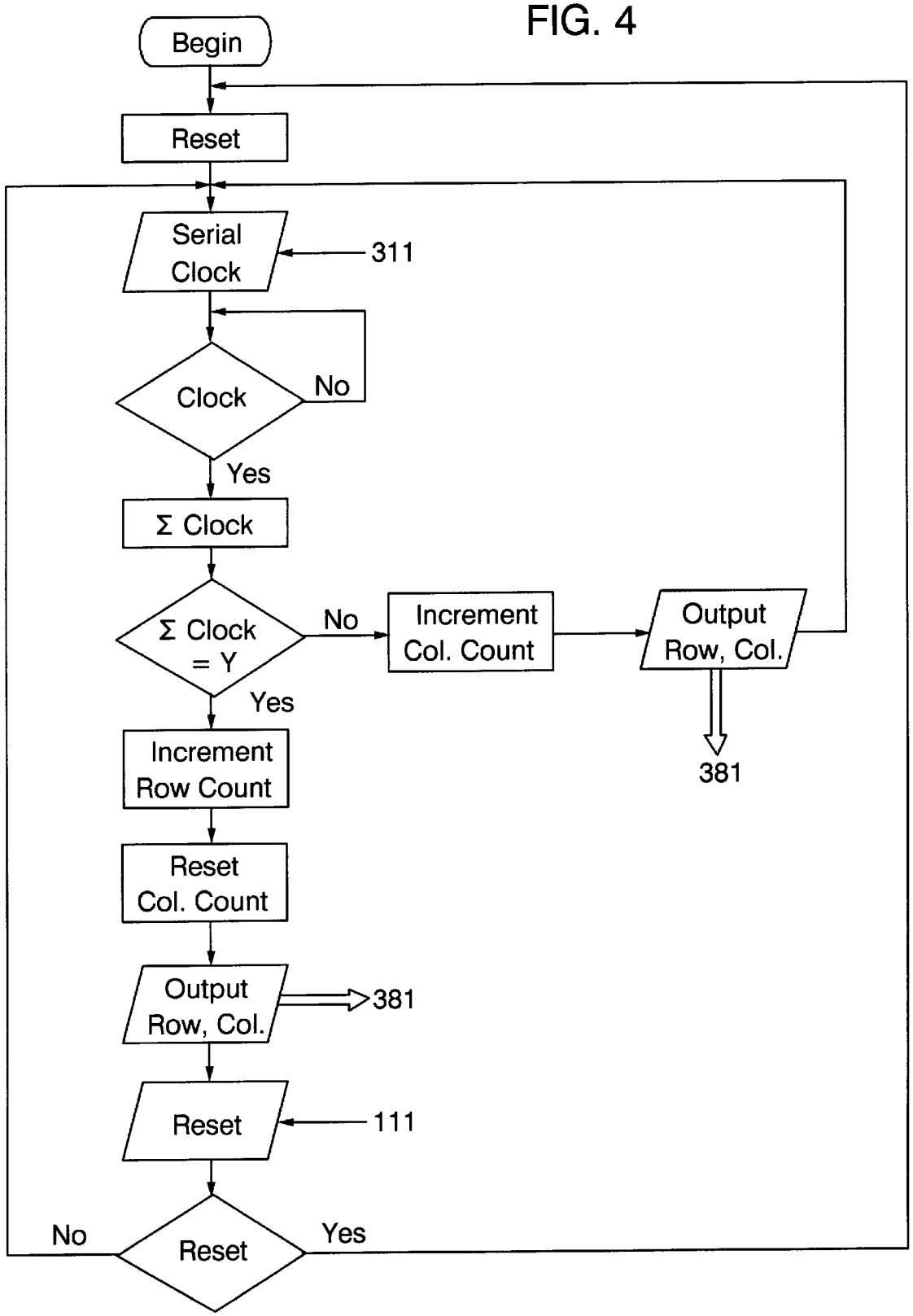
FIG. 4 illustrates a flow diagram of the row, column/count state machine of FIG. 3.

Row and column select signals are generated by row, column-count state machine 308. Row, column-count state machine 308 receives interface clock pulses from clock generator 301 on interface clock line 311. A flow chart of an embodiment of a row, column-count state machine 308 is illustrated in FIG. 4.

After reset, row, column-count state machine 308 accumulates interface serial clock pulses received on interface serial clock line 311. The logic to accumulate clock pulses is internal to row, column-count state machine 308 and is not shown in detail. If the number of clock pulses accumulated has not reached Y, the row, column-count state machine 308 increments the column count, outputs the row and column-count and continues to interface serial clock cycles received on interface serial clock line 311. Y is a preselected integer corresponding to the length of a data block to be downloaded in a single download cycle. Furthermore, in an embodiment in which all m bits of data are downloaded on one cycle, Y would equal m. An embodiment downloading byte-byte would have a value of Y equal to eight. Moreover, in the present invention, after microcontroller 101 first sends an n-bit address, row, column-count state machine 308 may adaptively set Y. For example, in an embodiment where the entire address is sent as a block, Y is initially set equal to n. After the n-bits have been received, row, column-count state machine 308 may set Y to a new preselected value. This new preselected value would be m in an embodiment in which m data bits are to be downloaded in a block. In an embodiment in which both the n-bit address and the m-bit data are sent byte-by-byte, Y would have a fixed value of eight.

If the clock accumulator has reached Y, the row, column-count state machine 308 increments the row count, resets the column count, and outputs the row and column count on its output bus 381. If a reset has not been received from microcontroller 101 on reset line 111, the row, column-count state machine 308 continues to accumulate clock cycles and continues to increment the row and column-counts as previously described. If a reset has been received on reset line 111, then the row, column-count state machine 308 resets. When the next operation commences, row, column-count state machine 308 begins accumulating clock cycles as they are received. The timing of the sequential operation of row, column-count state machine 308 is controlled by its internal clock (not shown). The internal clock need not be synchronized with the interface serial clock pulses on line 311, and the rate of the internal clock may be much greater than the rate of the interface serial clock pulses on line 311.

After sending the n-bit initial address, microcontroller 101 sends a command byte. Command logic 309 decodes a row and column address received from row, column-count state machine 308 on output line 381. After the eight bits of the command byte have been clocked into shift register 302, command logic 309 latches the command byte which it receives on the parallel bus 321 of shift register 302. The state of the first bit of the command byte informs the serial/parallel interface 102 whether the operation to be performed is a read or a write. Command logic 309 ascertains the state of the first bit of the command byte and sets the state of read/write state machine 307 through output line 391 of command logic 309. In one embodiment of the present invention in which data transfer is byte-by-byte, if a write operation is to be performed, the last four bits of the command byte includes the lowest nibble of the first data byte to be downloaded, as describe above.

Figure 5:
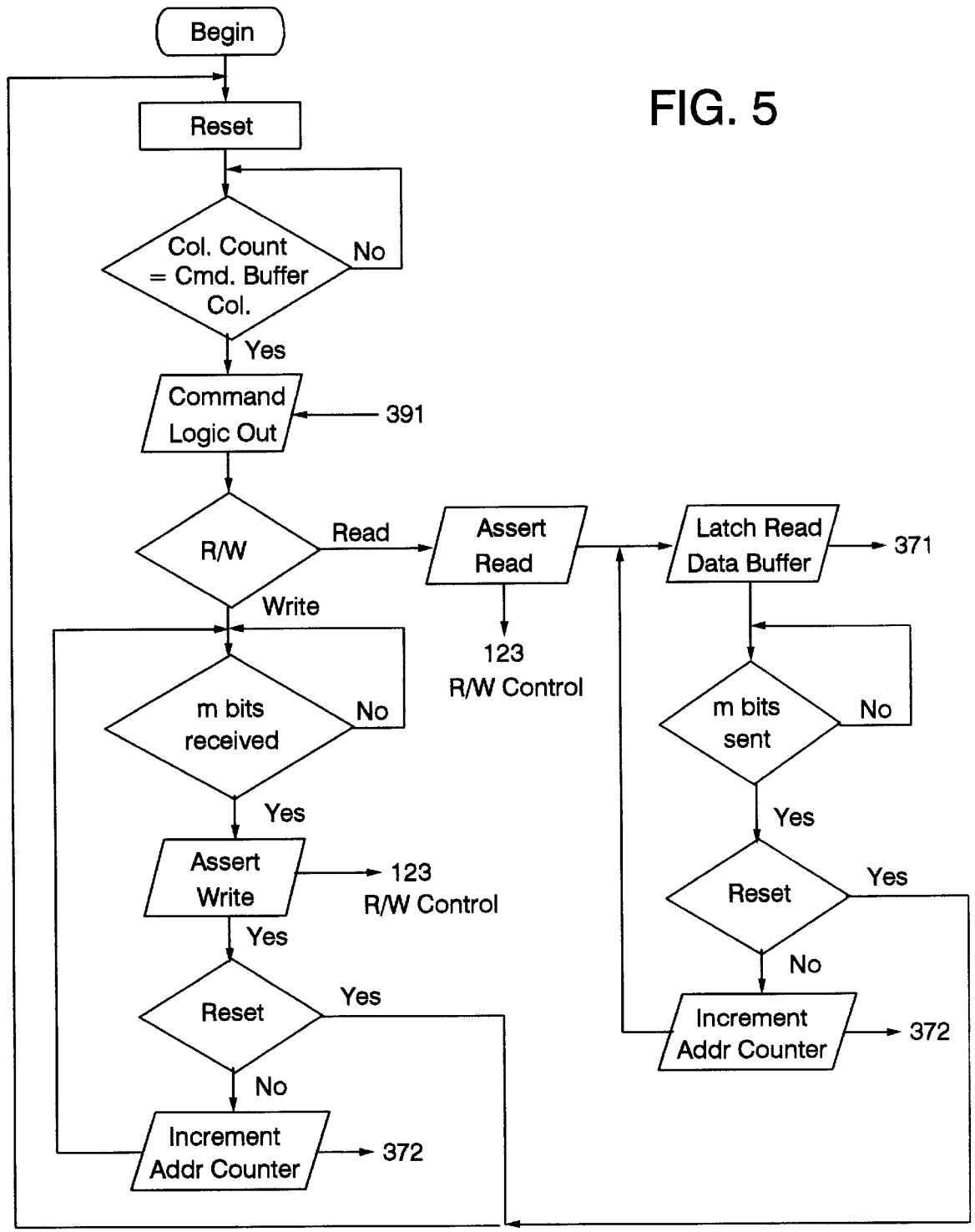
FIG. 5 illustrates a flow diagram of the read/write state machine of FIG. 3.

Read and write operations are controlled by read/write state machine 307. A flow chart of an embodiment of a read/write state machine 307 is illustrated in FIG. 5. Read/write state machine 307 receives the output row and column addresses on the row and column address bus 381 by the row, column-count state machine 308. If the command logic has been addressed, then read/write state machine 307 tests the state of the output line 391 of command logic 309. If line 391 is in a read state, read/write state machine 307 asserts a read on R/W control bus 123. It then commands read data buffer 206 to latch the data on data bus 122 via line 371. The first block of data to be sent resides at the initial address loaded into address counter 303. If, after m-bits have been sent, a reset has not been asserted, R/W state machine 307 increments address counter 303 so that the address of the next block of data to be read appears on address bus 121. Address counter 303 increments the address on address bus 121 in response to the address increment signal received from read/write state machine 307 via address counter increment line 372. After latching the data, read data buffer 206 clocks the data out via serial data line Rx/TxD 113. Clocking of the data is controlled by the serial clock pulses asserted by clock generator 301 on interface serial clock line 311. After the address counter 303 has been incremented, the cycle repeats until a reset is asserted on reset line 111 by microcontroller 101 (not shown).

If a write is to be performed, read/write state machine 307 accumulates the number of bits received. When m-bits have been received, read/write state machine 307 asserts a write on R/W control bus 123. Read/write state machine 307 then tests to see if a reset has been asserted. If a reset has been asserted, read/write state machine 307 resets, otherwise, it increments address counter 303 via address counter increment line 372. This cycle repeats until a reset has been asserted on reset line 111 by microcontroller 101. The timing of the sequential operations of R/W state machine 307 is controlled by its internal clock (not shown). The internal clock may not be synchronized with the interface serial clock on line 311, and the rate of the internal clock may be much greater than the rate of the interface serial clock pulses on line 311.

In a write operation, data to be written to data byte 122 is received by data logic 305. Data may be transmitted from microcontroller 101 byte-by-byte. In such an embodiment the command byte includes the lowest nibble of the first data byte to be downloaded, as discussed above. Data logic 305 receives the command byte on the parallel bus 321 of shift register 202. The next byte sent by microcontroller 101 through its serial port, Rx/TxD 113, contains the high nibble of the first data byte in its lower four bits, and the low nibble of the next data byte in its four upper bits. Data logic 305 receives the next byte transmitted by the parallel bus 321 of shift register 302 and latches this output byte. Data logic 305 then concatenates the low nibble and the high nibble of the first data byte and transfers it to data bus 122. Microcontroller 101 continues to transmit data on serial line Rx/TxD 113 in this interleaved fashion. Data logic 305 latches the output bytes as they are received and concatenates the low nibble and high nibble of each byte of data as described above. Latching of the data at data logic 305 is controlled by the interface serial clock pulses generated on line 311. It would be well understood by an artisan of ordinary skill that communication of data bytes using this method is independent of whether the mode of data representation is LSB first, or MSB first. After m-bits of data have been transmitted, the data is written to bus device 103 by read/write state machine 307 asserting a write state on R/W control bus 123. If, after m-bits have been sent, a reset has not been asserted, R/W state machine 307 increments address counter 303 so that the address of the next block of data to be read appears on address bus 121. Address counter 303 increments the address on address bus 121 in response to the address increment signal received from read/write state machine 307 via address counter increment line 372. Subsequent m-bit blocks of data are transmitted in this way until all the data to be downloaded has been sent, and microcontroller 101 asserts a reset on reset line 111. Serial/parallel interface 102 is then ready to begin the next operation.

The data processing system and methodology represented in the embodiments described herein are effective solutions to the associated problems of interfacing bus devices with an embedded controller having a limited number of parallel I/O buses, and dynamic updating of the operating software of the data processing system. Although the present invention and its advantages have been described in detail, it should be understood that various changes, substitutions and alterations can be made herein without departing from the spirit and scope of the invention as defined by the appended claims.

What is claimed is:

1. A microcontroller system comprising:

a microcontroller having at least one parallel input/output ("I/O") bus, and a serial data port;

a serial-to-parallel interface logic circuit having a serial data port, a parallel address bus, and a parallel data bus, said serial data port adapted for communicating with said serial data port of said microcontroller, wherein a first data value communicated on said serial date port of said microcontroller is presented as a parallel data value on said parallel data bus, said serial-to-parallel interface logic circuit providing an address on said parallel address bus of said serial-to-parallel interface logic circuit; and a bus device adaptable for receiving said address on said parallel address bus of said serial-to-parallel interface logic circuit, said bus device adapted for accessing said data bus to communicate said parallel data value, wherein said serial-to-parallel interface logic circuit further comprises:

a shift resister for receiving serial data value, said shift register having a parallel output bus;

a clock sequencing logic circuit coupled to said microcontroller to recieve a serial clock signal, said clock sequencing logic providing a first clock signal for clocking said shift register;

an output data buffer for receiving a second data value on said parallel data bus of said-to-parallel interface logic circuit, said output data buffer operable for latching said data value on receipt of said first clock signal from said clock sequencing logic, said output data buffer asserting said second data value on said serial data port of said serial-to-parallel interface logic circuit;

an address logic circuit operable for receiving an address data value from said parallel bus of said shift register, said address data value capable of initializing a counter;

a control logic circuit operable for receiving a command value from said parallel output bus of said shift register, wherein said control logic circuitry configures said serial-to-parallel interface logic circuit to reflect an operation to be performed; and an input data buffer for receiving a download data value from said parallel output bus of said shift register, said input data buffer providing said download data value on said parallel data bus on said serial-to-parallel interface logic circuit, wherein said input data value is operable for latching said download data value, and wherein said control logic circuitry further comprise:

command logic circuitry adaptable for receiving said command value, and for providing a first command signal;

a read/write state machine adaptable for controlling read/write operations of said serial-to-parallel interface logic circuit in response to the first command signal received from said command logic circuitry; and a row, column-count state machine for outputting a plurality of row/column register select signals, said plurality of row/column register select signals generated in response to a plurality of clock signals from said clock sequencing logic, wherein said address logic circuit includes a plurality of address registers adaptable for selection in response to said plurality of row/column select signals, and said input data buffer is adaptable for selection in response to said plurality of row/column select signals.

2. The microcontroller system of claim 1 wherein said plurality of address registers further comprise a plurality of multiplexers-with-latch.

3. A microcontroller system comprising:

a microcontroller having at least one parallel input/output ("I/O") bus, and a serial data port;

a serial-to-parallel interface logic circuit having a serial data port, a parallel address bus, and a parallel data bus, said serial data port adapted for communicating with said serial data port of said microcontroller, wherein a first data value communicated on said serial data port of said microcontroller is presented as a parallel data value on said parallel data bus said serial-to-parallel interface logic circuit providing an address on said parallel address bus of said serial-to-parallel interface logic circuit; and a bus device adaptable for receiving said address on said parallel address bus of said serial-to-parallel interface logic circuit, said bus device adapted for accessing said data bus to communicate said parallel data value, wherein said serial-to-parallel interface logic circuit further comprises:

a shift register for receiving a serial data value, said shift register having a parallel output bus;

a clock generator for receiving an external serial clock signal synchronized with said serial data value, said clock generator generating a plurality of interface serial clock pulses in response to said external serial clock signal, wherein said shift register clocks in said serial data value in response to said plurality of interface serial clock pulses;

a state machine, wherein said state machine generates a row/column address signal in response to said plurality of interface serial clock pulses from said clock generator;

a multiplexer-with-latch for storing an address data value received on said parallel output bus of said shift register, said multiplexer-with-latch being selected for receiving said address data value in response to said row/column address signal from said state machine;

an address counter for selecting an address on the parallel address bus of said serial-to-parallel interface logic circuit, wherein said address counter receives an initial address value from said address data value stored in said multiplexer-with-latch, said address counter incrementing the initial address value in response to an address counter increment signal;

a command logic circuit for receiving a command value from said parallel output bus of said shift register, said command logic decoding said command value to select one of a read operation and a write operation, said command logic circuit generating an operation select signal in response to said command value;

a read data buffer for receiving a second data value from the parallel data bus of said serial-to-parallel interface logic, said read data buffer operable for sending said second data value out a serial data line, said second data value being clocked onto said serial data line in response to said plurality of interface serial clock pulses from said clock generator;

a read/write state machine for receiving said operation select signal from said command logic circuit, said read/write state machine sending a control signal to the parallel data bus of said serial-to-parallel interface logic, and an enable signal to said read data buffer in response thereto, wherein said read/write state machine receives said plurality of interface serial clock pulses from said clock generators, and said row/column address signal from said state machine, said read/write state machine sending said address counter increment signal to said address counter in response thereto; and a data logic circuit for receiving the serial data value from said parallel output bus of said shift register, said data logic circuit operable for selecting in response to said row/column address signal, and outputting said serial data value on said parallel data bus of said serial-to-parallel interface logic circuit.

* * * * *